(12) United States Patent
Kabiry et al.

(10) Patent No.: US 9,197,340 B2
(45) Date of Patent: Nov. 24, 2015

(54) CONNECTOR AND INTERFACE CIRCUIT FOR SIMULTANEOUS CONTENT STREAMING AND USER DATA FROM HANDHELD DEVICES

(71) Applicant: Cadence Design Systems, Inc., San Jose, CA (US)

(72) Inventors: Ziv Kabiry, Kfar Saba (IL); Amir Bar-Niv, Sunnyvale, CA (US); Shlomy Chaikin, Moshav Mazor (IL)

(73) Assignee: CADENCE DESIGN SYSTEMS INC., San Jose, CA (US)

( * ) Notice: Subject to any disclaimer, the term of this patent is extended or adjusted under 35 U.S.C. 154(b) by 434 days.

(21) Appl. No.: 13/652,757

(22) Filed: Oct. 16, 2012

(65) Prior Publication Data
US 2014/0105230 A1 Apr. 17, 2014

(51) Int. Cl.
*H04J 3/02* (2006.01)
*H02J 7/00* (2006.01)

(52) U.S. Cl.
CPC .... *H04J 3/02* (2013.01); *H02J 7/00* (2013.01)

(58) Field of Classification Search
USPC .................. 348/734, 554, 474; 370/537, 538
See application file for complete search history.

(56) References Cited

U.S. PATENT DOCUMENTS

| | | |
|---|---|---|
| 2009/0248924 A1 | 10/2009 | Melin |
| 2010/0066919 A1* | 3/2010 | Nakajima et al. ............. 348/734 |
| 2010/0283894 A1 | 11/2010 | Horan et al. |
| 2011/0063501 A1* | 3/2011 | Bar-Niv et al. ............... 348/474 |
| 2011/0216242 A1* | 9/2011 | Kabuto et al. ................. 348/554 |
| 2011/0294359 A1 | 12/2011 | Cho et al. |
| 2012/0003863 A1 | 1/2012 | Sung et al. |
| 2012/0005377 A1 | 1/2012 | Kim et al. |
| 2012/0131245 A1 | 5/2012 | Wilcox |
| 2012/0173776 A1 | 7/2012 | Jones |
| 2012/0204048 A1 | 8/2012 | Kim et al. |

* cited by examiner

*Primary Examiner* — Dang Ton
*Assistant Examiner* — Pamit Kaur
(74) *Attorney, Agent, or Firm* — Pearl Cohen Zedek Latzer Baratz LLP

(57) ABSTRACT

An apparatus for enabling simultaneous multimedia content and user data streaming from a handheld device to a display device is disclosed. The apparatus enables power charging of the handheld device while streaming the multimedia content and the user data from the handheld device. The apparatus comprises a data-multimedia-power interface (DMPI) connector installed in the handheld device and designed to enable the transport of at least high definition multimedia signals, data signals, a power signal, and control signals between the handheld device and the display device; and a DMPI circuit for multiplexing the high definition multimedia signals with the data signals, to enable simultaneous streaming of the respective multimedia content and the user data to the display device, wherein the DMPI circuit further extracts a power signal from the display device for power charging of the display device.

28 Claims, 5 Drawing Sheets

CONNECTOR AND INTERFACE CIRCUIT FOR SIMULTANEOUS CONTENT STREAMING AND USER DATA FROM HANDHELD DEVICES

TECHNICAL FIELD

This invention generally relates to the connectivity of handheld devices and electronic display devices, and more particularly to an apparatus for enabling the simultaneous charging of a handheld device by a display device and streaming of multimedia content as well as user data from a handheld device to a display device.

BACKGROUND

A number of standards that define digital display interfaces of a digital audio/video interconnect are discussed in the related art. One example for such a standard is the high-definition multimedia interface (HDMI) which is a compact audio/video connector interface for transmitting uncompressed digital streams. The HDMI connects a digital multimedia (or audio/video) source (e.g., a set-top box, a DVD player, a personal computer, a video game console, etc.) to a compatible digital sink, such as a digital television.

DisplayPort™ (or DP) is another example for a standard that defines a digital display interface of a digital audio/video interconnect. The DP is intended to be used primarily between a computer and its display monitor, or a computer and a home-theater system. The DP interface is facilitated using a proprietary cable and connectors, each of which includes 20 pins. The DP cable is a cross cable, i.e., each of the source and sink connectors has a different configuration.

In a typical configuration, transport channels of a DP interface include a main link, an auxiliary (AUX) channel, and a hot plug detect (HPD) channel. The main link is a unidirectional channel that allows data transfers over up to 4 lanes; the lanes carry clock signals in addition to the video/audio streams. Each lane is an AC-coupled differential pair. The auxiliary channel is a bi-directional half-duplex channel that carries control and management information, and the HPD channel is used by a sink device to interrupt a source device when a plug is connected or disconnected.

Recently, interface standards that define the digital display interfaces of a digital audio/video interconnect for portable devices (such as smart phones, tablet computers, and the like) have been defined, one example of which is the mobile high-definition link (MHL). The MHL is a proposed industry standard for a mobile audio/video interface for the direct connection of mobile phones and other portable consumer electronics (CE) devices to high-definition televisions (HDTVs) and displays. Specifically, the MHL is an interface protocol that provides for the connection of a mobile device to an HDMI display device. A current implementation of an MHL connector is a 5-pin MHL-USB connector, which is based on a micro-USB type connector. However, the MHL connectivity does not support data transfer according to the USB protocols, but rather only MHL signaling through the connectors and over the cable that are used.

The MHL signaling includes a single transition minimized differential signaling (TMDS®) channel utilized to transfer video, audio, and auxiliary data encapsulated in TMDS characters. Such transmission is synchronized using a high-frequency clock signal running as a common mode for the TMDS channel. The TMDS channel is a differential pair channel. A MHL cable also includes a control BUS ($C_{BUS}$) for sign HPD, which also carries control information.

The MHL interface supports video and digital audio while simultaneously charging the connected mobile device. With this aim, the MHL interface includes a $V_{BUS}$ signal originated at the sink device (e.g., digital TV) through which the mobile device is being charged. The MHL connector is the mobile device while at the sink device an HDMI connector having 19 pins is utilized.

Mobility DisplayPort™ (or MyDP) is another standard that defines an audio/video interconnect interface for mobile devices. The MyDP standard is based on the DisplayPort™. Current implementation of a MyDP connector is a 5-pin proprietary connector. The MyDP connectivity includes a main link, an auxiliary channel with a hot plug detect (AUX_HPD) channel, and a DP_PWR signal for charging a source device (e.g., a smart phone) by a sink device (e.g., a digital TV). The main link is a unidirectional channel that carries clock signals in addition to the video/audio streams. The main link is an AC-coupled differential pair (i.e., includes 2 wires). The AUX_HDP channel is a bi-directional half-duplex channel that carries control and management information. The AUX_HDP channel is also used by a sink device to interrupt a source (handheld) device when a plug is connected or disconnected.

The Universal Serial Bus (USB) standard is primarily utilized to establish communication between devices and a host controller of a PC. The USB can connect computer peripherals, such as mice, keyboards, digital cameras, printers, personal media players, flash drives, network adapters, external hard drives, and the like. The USB was designed for personal computers, but it has become commonplace on handheld devices, such as mobile phones, smartphones, PDAs, tablet computers, camcorders, and video game consoles. The USB can also serve as a power cord for charging such devices. For many types of handheld devices, the USB is the only standard interface. The various USB protocols support different transmission rates for data. For example, data transmission rates of USB 2.0 can be 1.5 Mbps (Low speed), 12 Mbps (Full Speed), and High speed (480 Mbps). The USB 3.0 standard defines a higher speed data transmission rate of 5 Gbps, and therefore can be utilized as a database for mass storage devices, and the like.

There are several types of USB connectors. The most common connectors for handheld devices are micro USB 5-pin Standard-AB plugs and receptacles. Typically, the USB connectors in the Standard-AB plug are recessed in the plug, thereby allowing the power to be connected first, thus preventing data errors by allowing the device to power up first and then transfer data. The pin out of a standard-micro USB 2.0 AB plug and receptacle is detailed in Table 1:

TABLE 1

| Pin Number | Pin Name | Function |
|---|---|---|
| 1. | VBUS | Power |
| 2. | D− | USB 2 Diff pair |
| 3. | D+ | |
| 4. | ID | Allows distinction of host connection from slave connection |
| 5. | GND Shield | Ground for power return |

Another popular connector is a standard AB micro USB 3.0 10-pin connector, the pin out of which is provided in Table 2:

TABLE 2

| Pin Number | Pin Name | Function |
|---|---|---|
| 1. | VBUS | Power |
| 2. | D− | USB 2 Diff pair |
| 3. | D+ | |
| 4. | ID | Keying |
| 5. | GND | Ground for power return |
| 6. | MicB_SSTX− | Super speed RX diff pair |
| 7. | MicB_SSTX+ | |
| 8. | GND_Drain | Ground for signal return |
| 9. | MicB_SSRX− | Super speed TX diff pair |
| 10. | MicB_SSRX+ Shield | |

USB specifications provide a 5V±5% supply on a single wire from which connected USB devices may draw power between the positive and negative bus power lines. A unit load is defined as 100 mA in USB 2.0 and 150 mA in USB 3.0. A maximum of 5 unit loads (500 mA) can be drawn from a port in USB 2.0 and 6 unit loads (900 mA) can be drawn from a port in USB 3.0.

As mentioned above, the new mobile connectivity interfaces, such the MHL and MyDP, enable streaming of multimedia content (video/audio), while charging the device. However, these mobile connectivity interfaces introduce some limitations. For example, higher video resolution cannot be transferred when charging the mobile device. In addition, user data (e.g., data files, images, etc.) stored in the handheld device or in the sink device cannot be transferred using these mobile connectivity interfaces.

For example, as noted above the MHL connector is a micro USB 5-pin type connector. However, the MHL standard does not support USB signaling and data transferring. Thus, a MHL-type cable is used to stream multimedia connect, while another USB cable is required to transfer USB data.

Thus, it would be advantageous to provide a solution that would enable simultaneous power charging as well as streaming of data and multimedia signals through a single cable having a single connector in handheld devices.

SUMMARY

Certain embodiments disclosed herein include an apparatus for enabling simultaneous multimedia content and user data streaming from a handheld device to a display device, the apparatus further enables power charging of the handheld device while streaming the multimedia content and the user data from the handheld device. The apparatus comprises a data-multimedia-power interface (DMPI) connector installed in the handheld device and designed to enable the transport of at least high definition multimedia signals, data signals, a power signal, and control signals between the handheld device and the display device; and a DMPI circuit for multiplexing the high definition multimedia signals with the data signals, to enable simultaneous streaming of the respective multimedia content and the user data to the display device, wherein the DMPI circuit further extracts a power signal from the display device for power charging of the display device.

Certain embodiments disclosed herein also include a data-multimedia-power interface (DMPI) circuit integrated in a handheld device for enabling at least simultaneous multimedia content and user data streaming from the handheld device to a display device. The display device comprises a recognition circuit for detecting a type of a connectivity interface at the display device connected to the handheld device; a DMPI physical layer circuit connected to a video processor and a memory unit, wherein the DMPI physical layer circuit is configured to at least multiplex the high definition multimedia signals with the data signals; a plurality of physical layer circuits of a plurality of mobile connectivity interfaces for processing multimedia signals according to their respective mobile connectivity interface standards, wherein each of the plurality of physical layer circuits is connected to the video processor; and a data interface physical layer is connected to the memory unit and is configured to process data signals according to a data interface standard.

Certain embodiments disclosed herein also include a data-multimedia-power interface (DMPI) connector for connecting a handheld device to a display device. The connector comprises a housing and a plurality of contact pins arranged in the housing, wherein the plurality of contact pins are arranged to provide at least: a VBUS channel for receiving a power signal from the display device, a high-speed receive (HSRX) channel for receiving at least control signals and data signals from the display device, at least one high-speed transmit (HSRX) channel for transmitting multiplexed high definition multimedia signals and the data signals to the display device, and a ground connection.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
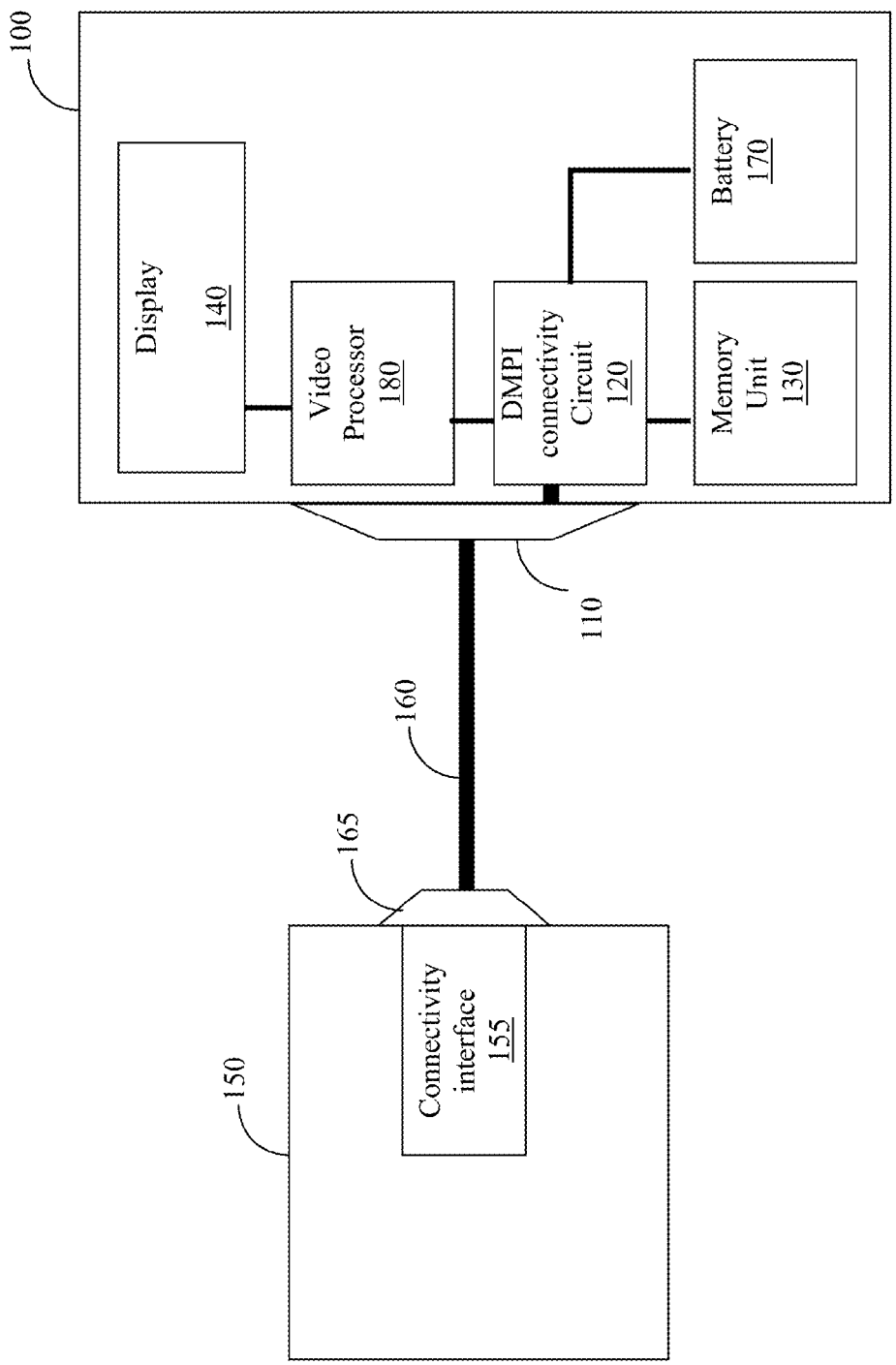
FIG. 1 is a schematic diagram illustrating the connection between a handheld device and a sink device using a data-multimedia-power interface according to an embodiment of the invention.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a handheld device 100 configured to include a data-multimedia-power interface (DMPI) designed in accordance with an embodiment of the invention. The DMPI is realized through a DMPI connector 110 and a DMPI circuit 120. The handheld device 100 typically includes a memory unit (e.g., flash memory) 130 to maintain user data files, such as documents, image files, and audio/video files. The memory unit 130 may be a memory card, such as a SD card, universal flash storage (UFS), a multi media card (eMMC), and the like. Typically, such memory cards include an interface, a flash memory, and a controller. The memory cards, hence memory unit 130, are defined by their different classes, each of which has a different bandwidth for outputting data stored therein. For example, the maximum bandwidth for eMMC is 1.6 Gbps (bi-directional), for SDcard is 1.56 Gbps (bi-directional), and for UFS is 5.8 Gbps.

The handheld device 100 also includes a video processor 180 that generates video streams to be transmitted to an external display, through a sink device 150, to the DMPI connector 110 and a cable 160. The video processor 180 can also provide such streams to the display 140. The device 100 also includes a rechargeable battery 170. It should be noted that the handheld device 100 typically includes other circuitries, such as a processor, a wireless transceiver, and the like, which are not shown in FIG. 1 merely for the sake for simplicity. The handheld device 100 may include, but is not limited to, a mobile phone, a smart phone, a laptop computer, a tablet computer, a personal digital assistant (PDA), a camcorder, and the like.

The DMPI connector 110 and circuit 120 enable transmission of high-definition multimedia data and data concurrently on the cable 160 that connects the device 100 to the sink device 150 (e.g., a high-definition TV, or a display). Furthermore, through the DMPI connector 110 and circuit 120, the sink device 150 can charge the battery 170. The power charging can be performed simultaneously with the transmission of data and multimedia signals from the device 100 to the sink device.

In one embodiment, the DMPI connector 110 is structured to include a plurality of contact pins and a housing (chassis) in which the pins are arranged. The pins, at one end, are connected to the DMPI circuit 120, and at another end are connected to a contact plate into which a receptacle connector is inserted. In another embodiment, the DMPI connector 110 is structured to include a housing where the pins are arranged. The pins, at one end, are connected to a cable (e.g., cable 160), and at another end, to the receptacle connector (not shown in FIG. 1). The housing may be formed from a conductive material covered by a plastic cover.

The DMPI connector 110 is designed to transfer high definition multimedia signals, data signals, a power signal, as well clock and control signals synchronizing the transmission of at least the user data and high-definition multimedia signals. The DMPI connector 110 is also compatible with other mobile connectivity interfaces, such as MHL, MyDP, a digital connectivity interface, such as DisplayPort™, and the USB. Therefore, in an embodiment of the invention, the DMPI connector 110 supports the connectivity defined at least by these standardized connectivity interfaces. Specifically, each pin in the DMPI connector 110 serves a different function depending on the type of the connectivity to which the device 110 is connected. That is, the device 100 with the DMPI connector 110 and circuit 120, at one end, can be connected at the other end to a MHL connector (interface), a MyDP connector (interface), a USB 2.0 connector (interface), a USB 3.0 connector (interface), a DP connector, a HDMI connector and the like. With this aim, the cable 160 includes, at one end, the DMPI connector 110, and at the other end of the cable, a connector 165. The connector 165 may be, for example, a MHL-type connector, a MyDP-type connector, a micro-USB type connector, an HDMI connector, a DP connector, and the like.

In accordance with one embodiment, the DMPI connector 110 includes 6 pins. An exemplary and non-limiting pin out of the DMPI connector 110 having 6 pins is listed in Table 3.

TABLE 3

| Pin Number | DMPI |
|---|---|
| 1. | $V_{BUS}$ |
| 2. | HSRX− |
| 3. | HSRX+ |
| 4. | HSTX− |
| 5. | GND |
| 6. | HSTX+ |

The function of the $V_{BUS}$ is to transfer a power signal from the sink device 150 to the handheld device 100. In an exemplary embodiment, the charging current is 500 mA. Pins 2 and 3 (HSRX−; HSRX+) of a 6-pin DMPI connector 110 are comprised of a receive channel (which is a differential pair) for receiving at the handheld device 100, both user data (USB-like data) and control signals, sent from the sink device 150.

The pins 4 and 6 (HSTX−; HSTX+) are of a transmit channel (which is a differential pair) for transmitting high speed multimedia signals (e.g., uncompressed high-definition video streams) multiplexed with user data (e.g., USB-like data) and control signals to the sink device 150. The user data is saved in the memory unit 130. A USB-like data refers to data typically transmitted over the USB.

In one embodiment, the bandwidth on the HSTX channel is fixed. The fixed bandwidth is determined based on the resolution of video and type of the memory unit 130 (e.g., eMMC, SDCard, USF, etc.). Typically, the bandwidth for transmitting high-definition video signals is 3.5 Gbps and 1.6 Gbps for user data. Exemplary bandwidths of the DMPI in a 6-pin connector configuration for different video streams resolutions and types of memory units are provided in Tables 4A and 4B:

TABLE 4A

| | No. of bits per pixel | BW required to transfer video [Gbps] | SDcard SDR12 [Gbps] | SDcard SDR104 [Gbps] | SDcard UHS156 [Gbps] |
|---|---|---|---|---|---|
| Bandwidth for user data [Gbps] | | | 0.1 | 0.832 | 1.56 |
| 720p@60 Hz | 24 | 1.78 | 2.975 | 3.890 | 4.800 |
| | 16 | 1.18 | 2.235 | 3.150 | 4.060 |
| 3D720p@30 Hz Or | 24 | 3.56 | 5.205 | | |
| 1080P@60 Hz | 16 | 2.37 | 3.720 | 4.635 | |

TABLE 4B

| | No. of bits per pixel | BW required to transfer video [Gbps] | eMMC Legacy [Gbps] | eMMC HS DDR [Gbps] | eMCC HS200 [Gbps] | UFS Gear 1 [Gbps] |
|---|---|---|---|---|---|---|
| Bandwidth for user data [Gbps] | | | 0.104 | 0.832 | 1.6 | 1.25 |
| 720p@60 Hz | 24 | 1.78 | 2.980 | 3.890 | 4.850 | 4.413 |
| | 16 | 1.18 | 2.240 | 3.150 | 4.110 | 3.673 |
| 3D720p@30 Hz Or 1080P@60 Hz | 24 | 3.56 | | | | |
| | 16 | 2.37 | 3.725 | 4.635 | | 5.158 |

The column "BW required to transfer video" represents the video resolution bandwidth for transmission of only uncompressed video (without any data) as defined by standard multimedia interfaces. As shown in Tables 4A and 4B, the fixed bandwidth (throughput) of the HSTX channel of the DMPI is higher than the video resolution bandwidth even when simultaneously transferring data from the memory unit 130 to the sink device over the cable 160.

For example, as depicted in Table 4A, the video resolution bandwidth required to transfer video at 720p@60 Hz is 1.78 Gbps and the bandwidth required for transferring user data when type of the memory unit 130 is an SDcard USC 156 is 1.56 Gbps. In such configurations, the fixed bandwidth (throughput) of the HSTX channel of the DMPI is 4.8 Gbps. As another example, the video resolution bandwidth required to transfer video at 1080P@60 Hz is 2.37 Gbps and the bandwidth for transfer of user data when the type of the memory unit 130 is an SDcard SDR 12 type is 100 Mbps. In such configurations, the fixed bandwidth (throughput) of the HSTX channel of the DMPI is 5.205 Gbps. Thus, the DMPI can support efficient transmission of video and data saved in an SDcard.

As illustrated in Table 4B, the DMPI in its 6-pin connector configuration supports video streams at resolutions of 720p@60 Hz with transmission of data retrieved from eMMC types Legacy, High-Speed (HS) DDR, and HS 200, and UFS type Gear 1. The DMPI in its 6-pin connector configuration also supports video streams at resolutions of 3D720p@30 Hz or 1080p@60 Hz for memory transmission of data retrieved from SDcard types SDR 12 and SDR 104, eMMC types Legacy and High-Speed (HS) DDR as well as UFS type Gear 1.

The mechanical characteristics (e.g., shape, size, etc.) may be the same as the 6-pin standard micro USB connector. However, it should be noted that the DMPI connector 110 can be defined using mechanical characteristics different than those of a standard AB micro USB connector.

In accordance with another embodiment, the DMPI connector 110 includes 10 pins. An exemplary pin out of the DMPI connector 110 having 10 pins is listed in Table 5.

TABLE 5

| Pin Number | DMPI |
|---|---|
| 1. | $V_{BUS}$ |
| 2. | HSRX− |
| 3. | HSRX+ |
| 4. | HSTX0− |
| 5. | GND |
| 6. | HSTX0+ |
| 7. | HSTX1− |
| 8. | GND |
| 9. | HSTX1+ |
| 10. | Not-Connected |

The function of the $V_{BUS}$ is to transfer a power signal from the sink device to the handheld device 100. In an exemplary embodiment, the charging current can be up to 3 A. The 10-pin connector also includes two transmit channels, pins 4, 6 (HSTX0−; HSTX0+); and pins 7, 9 (HSTX1−; HSTX1+). Each HSTX channel is a differential pair. The 10-pin DMPI connector also includes a receive channel at pins 2, 3 (HSRX−; HSRX+) which is also a differential pair. In one embodiment, the 10-pin DMPI connector includes only two HSTX (transmit) channels.

In the 10-pin DMPI connector, the receive channel (HSRX) is utilized to receive both user data (USB-like) and control signals sent from the sink device 150. Furthermore, over each transmit channel (HSTX0, HSTX1), high speed multimedia signals multiplexed with user data (USB like) and control signals are transmitted to the sink device 150. The user data is saved in the memory unit 130. As more channels are available, the throughput of the DMPI is increased. Specifically, higher bandwidth (relative to the 6-pin configuration) of high speed multimedia signals and user data can be transmitted to the sink device 150. In one embodiment, the bandwidth on the HSTX channels is fixed and is determined based on the resolution of video streams and type of the memory unit 130. Exemplary bandwidths of the DMPI in a 10-pin connector configuration for different video streams resolutions and types of memory units are provided in Tables 6A, 6C and 6B:

TABLE 6A

| | No. of bits per pixel | BW required to transfer video [Gbps] | SDCard SDR12 [Gbps] | SDCard SDR104 [Gbps] | SDCard UHS156 [Gbps] |
|---|---|---|---|---|---|
| BW for user data | | | 0.1 | 0.832 | 1.56 |
| 3D720p30 Hz Or 1080P60 Hz | 24 | 3.56 | | 6.120 | 7.030 |
| | 16 | 2.37 | | | 5.545 |
| 3D1080P60 OR 4K2KP30 | 24 | 7.13 | 9.663 | 10.578 | |
| | 16 | 4.75 | 6.688 | 7.603 | 8.513 |

TABLE 6B

| | No. of bits per pixel | BW required to transfer video [Gbps] | eMMC Legacy | eMMC HS DDR | eMMC HS200 |
|---|---|---|---|---|---|
| BW for user data | | | 0.104 | 0.832 | 1.6 |
| 3D720p30 Hz Or 1080P60 Hz | 24 | 3.56 | 5.210 | 6.120 | 7.080 |
| | 16 | 2.37 | | | 5.595 |
| 3D1080P60 OR 4K2KP30 | 24 | 7.13 | 9.668 | 10.578 | |
| | 16 | 4.75 | 6.693 | 7.603 | 8.563 |

TABLE 6C

| | No. of bits per pixel | BW required to transfer video [Gbps] | UFS Gear 1 [Gbps] | UFS Gear 2 [Gbps] | UFS Gear 3 [Gbps] |
|---|---|---|---|---|---|
| BW for user data | | | 1.25 | 3 | 5.8 |
| 720p60 Hz | 24 | 1.78 | | 6.600 | 10.100 |
| | 16 | 1.18 | | 5.860 | 9.360 |
| 3D720p@30 Hz Or 1080P@60 Hz | 24 | 3.56 | 6.643 | 8.830 | |
| | 16 | 2.37 | | 7.345 | 10.845 |
| 3D1080P@60 Hz OR 4K2KP30 | 16 | 4.75 | 8.125 | 10.313 | |

The column "BW required to transfer video" represents the video resolution bandwidth for transferring only uncompressed video (without any data) as defined by standard multimedia interfaces. Table 6A lists the bandwidth of the HSTX channels in the 10-pin configuration for SDcard types SDR 12, SDR 104, UHS 156; Table 6B lists the bandwidth of the HS TX channels for eMMC type Legacy, High-Speed (HS) DDR, and HS 220; and Table 6C lists the bandwidth of the HS TX channels for UFS types Gear 1, Gear 2, and Gear 3.

As shown in Tables 6A, 6B, and 6C, the throughput of the DMPI is higher than the video resolution bandwidth even when simultaneously transferring data from the memory unit 130 to the sink device 150 over the cable 160. For example, the video resolution bandwidth required to transfer video at 4K2KP30 is 7.13 bps and the bandwidth for user data when the memory unit 130 is an SDcard SDR 104 type of storage is 0.83 Gbps. In such configurations, the bandwidth of the HSTX channels of the DMPI is 10.578 Gbps.

The mechanical characteristics (e.g., shape, size, etc.) may be the same as the 10-pin standard AB micro USB connector. However, it should be noted that the DMPI connector can be defined using mechanical characteristics different that those of a 10-pin micro USB connector.

In accordance with one embodiment, the 10-pin DMPI connector can be connected to a "Y-type" cable having, at one end, the 10-pin DMPI connector and, at the other end of the cable two connectors. In one embodiment shown in FIG. 2A, a handheld device 200 includes a DMPI 10-pin connector 210 that allows connectivity through a Y-type cable 201 to a USB host (not shown) having a USB connector 220 and a sink device (not shown) having a MHL connector 230. The MHL connector 230 serves as the sink connector for a MHL source device and it is realized as a 19-pin HDMI connector.

Figure 2A:
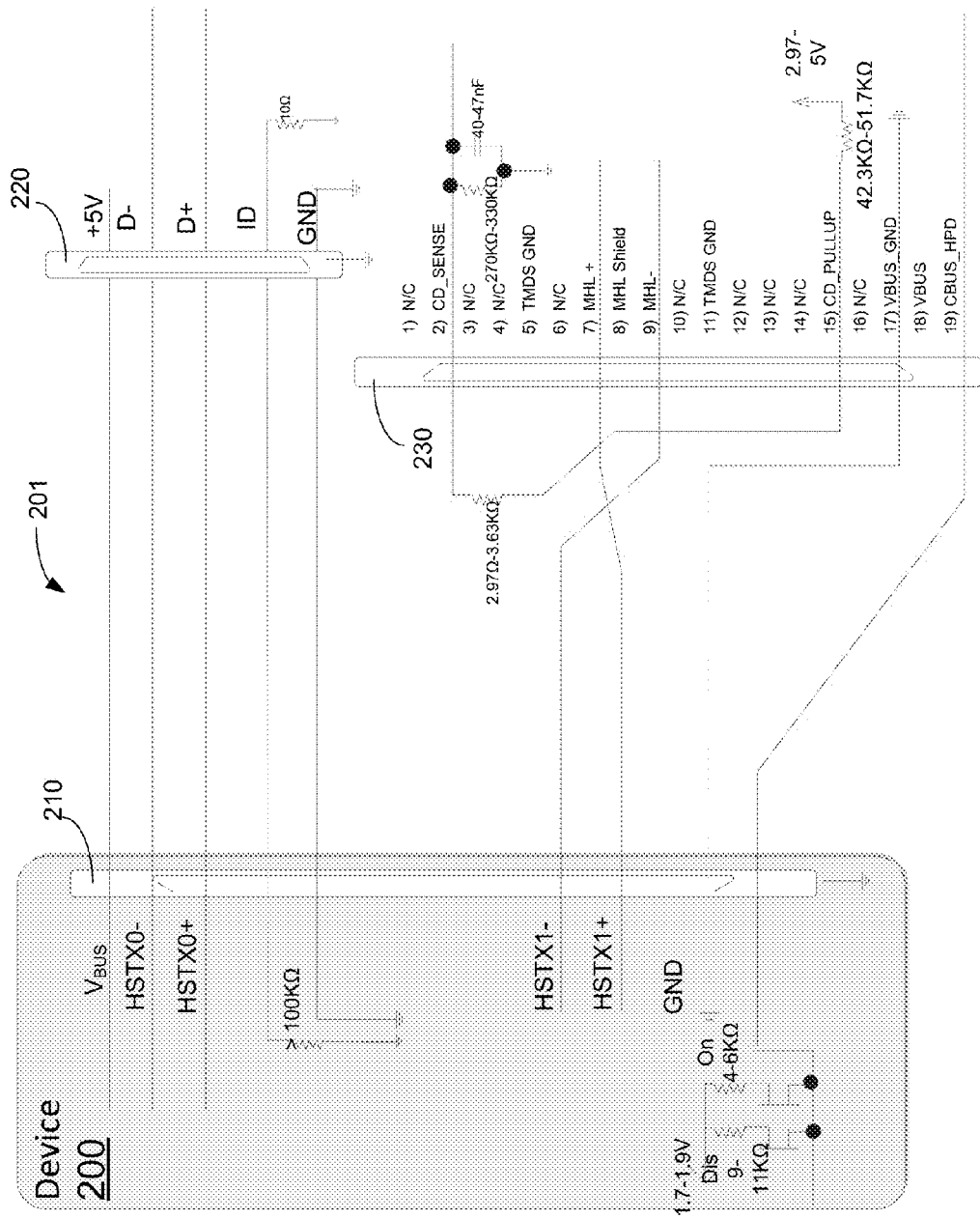
FIGS. 2A and 2B are schematic diagrams illustrating the wiring of different types of Y-type cables utilized for simultaneous transmission of data and multimedia as well power charging, according to certain embodiments disclosed herein.

As shown in FIG. 2A, the $V_{BUS}$ (pin number 1) at a DMPI connector 210 is connected to a $V_{BUS}$ pin at the USB connector 221; and the HSTX0 channel's pins (pins 4 and 6 at the connector 210) are respectively wired to the pins of the data channel at the USB connector 220. Further, the HSTX1 channel's pins (pins 7 and 9 at the DMPI connector 221) are connected the pins of the MHL channel in the HDMI connector 230. The MHL channel is utilized to transfer video, audio, and auxiliary data encapsulated in TMDS characters. The $C_{BUS}$ channel of the MHL connector 230 is connected to a circuit that detects an existence of a CBS channel at the DMPI circuit, through pin 6 or 7 at the DMPI connector 210.

Figure 2B:
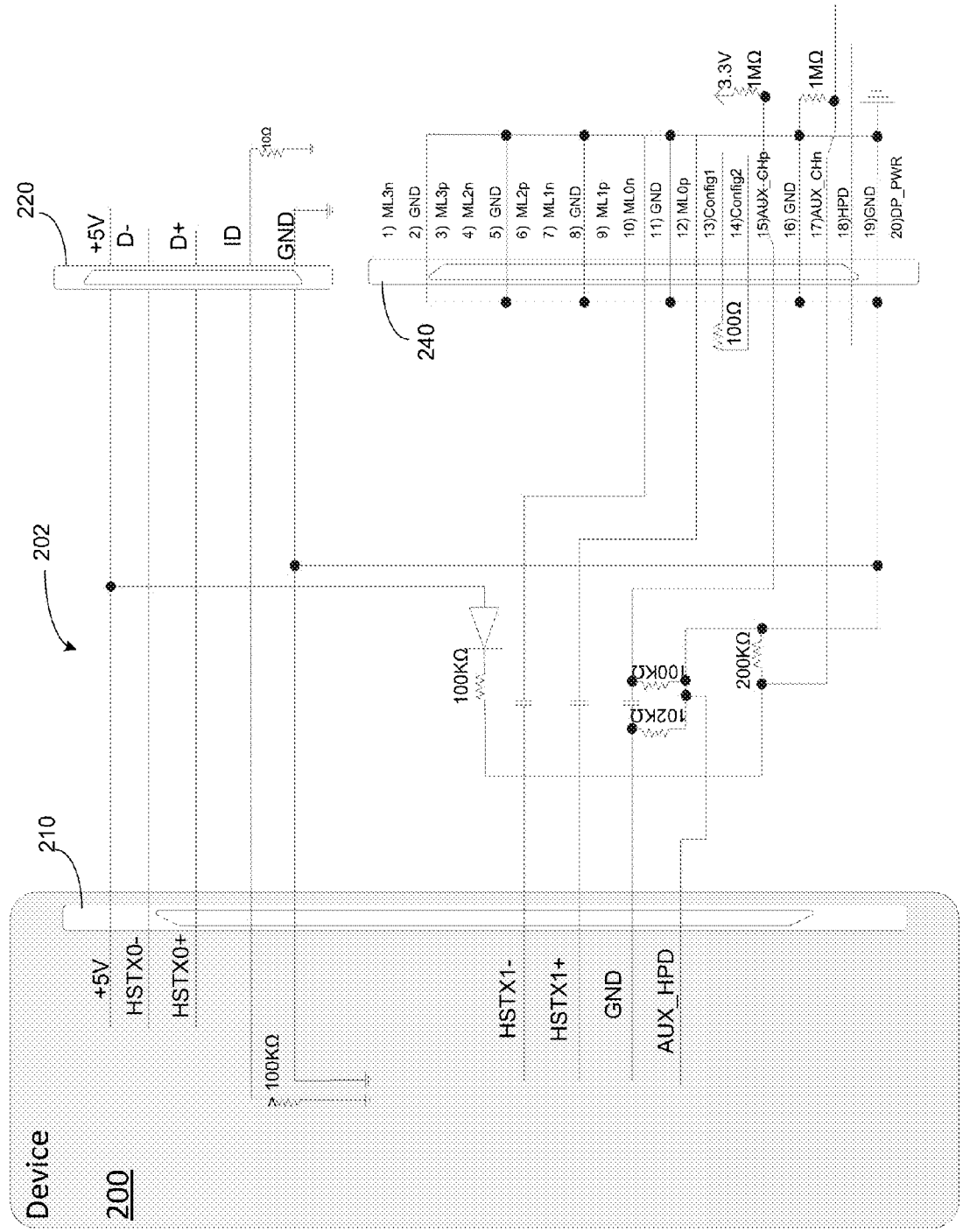

In another embodiment shown in FIG. 2B, a handheld device 200 includes a DMPI 10-pin connector 210 that allows connectivity through a Y-type cable 202 to a USB host (not shown) having a 5-pin USB connector 220 and a sink device (not shown) having a DP connector 240. For example, as shown in FIG. 2B, the $V_{BUS}$ at a DMPI connector 210 is connected to a $V_{BUS}$ pin at the USB connector 220; and the HSTX0 channel's pins (pins 4 and 6 at the DMPI connector 210) are respectively wired to pins of the data channel at the USB connector 220. Further, the HSTX1 channels' pins at the DMPI connector 221 are connected to the DP lane pins (pins 10 and 12) at the DP connector 241. The DP connector 241 is a 20-pins DP connector.

In another embodiment, the DMPI connector 110 includes 5 pins. An exemplary and non-limiting pin out of the DMPI connector 110 having 5 pins is listed in Table 7.

TABLE 7

| Pin Number | DMPI |
| --- | --- |
| 1. | VBUS |
| 2. | HSTX− |
| 3. | HSTX+ |
| 4. | HSRX |
| 5. | GND |

In this configuration, the HSRX channel is not a differential pair, but rather a single line utilized to transfer data and control signals from the sink device to the handheld device. The mechanical characteristics (e.g., shape, size, etc.) may be the same as a 5-pin standard AB micro USB connector. However, it should be noted that the DMPI connector 110 can be defined using mechanical characteristics different than those of a standard AB micro USB connector.

It should be further noted that the indicated pin numbers in Tables 3, 5, and 7 and in reference to FIGS. 2A and 2B are only examples used for ease of understanding. One of ordinary skill in the art recognizes that the pin assignments may be designed to be in any location based on design expediency.

Referring back to FIG. 1, the sink device 150 also includes an interface connective circuit 155 which may compliant with one of the MHL, MyDP, DisplayPort™, USB 2.0, and USB 3.0 devices. The circuit 155 can also provide connectivity interface according to the DMPI disclosed herein below. Therefore, in order to configure the handheld device 100 to send signals that would be properly processed by the sink device 150, the DMPI circuit 120 automatically recognizes the type of interface connectivity supported by the circuit 155 using a recognition method. The DMPI circuit 120 is a physical layer interface capable of processing DMPI, USB, MHL, and MyDP signals. Thus, the DMPI circuit 120 recognizes the type of the mobile connectivity interface connected at the other end of the cable 160, and configures the handheld device 100 accordingly.

For example, if the sink device 150 supports a MHL connectivity interface, the DMPI circuit 120 recognizes that a MHL type of interface is connected at the other end of the cable 160, and sets the handheld device 100 to process MHL signals. This includes, for example, setting analog circuits of an analog front-end of the DMPI circuit 120 to a mode of operation compliant with the source device. The DMPI circuit 120 also recognizes when a charging current flows from the sink device 150, and enables the recharging the battery 170.

Figure 3:
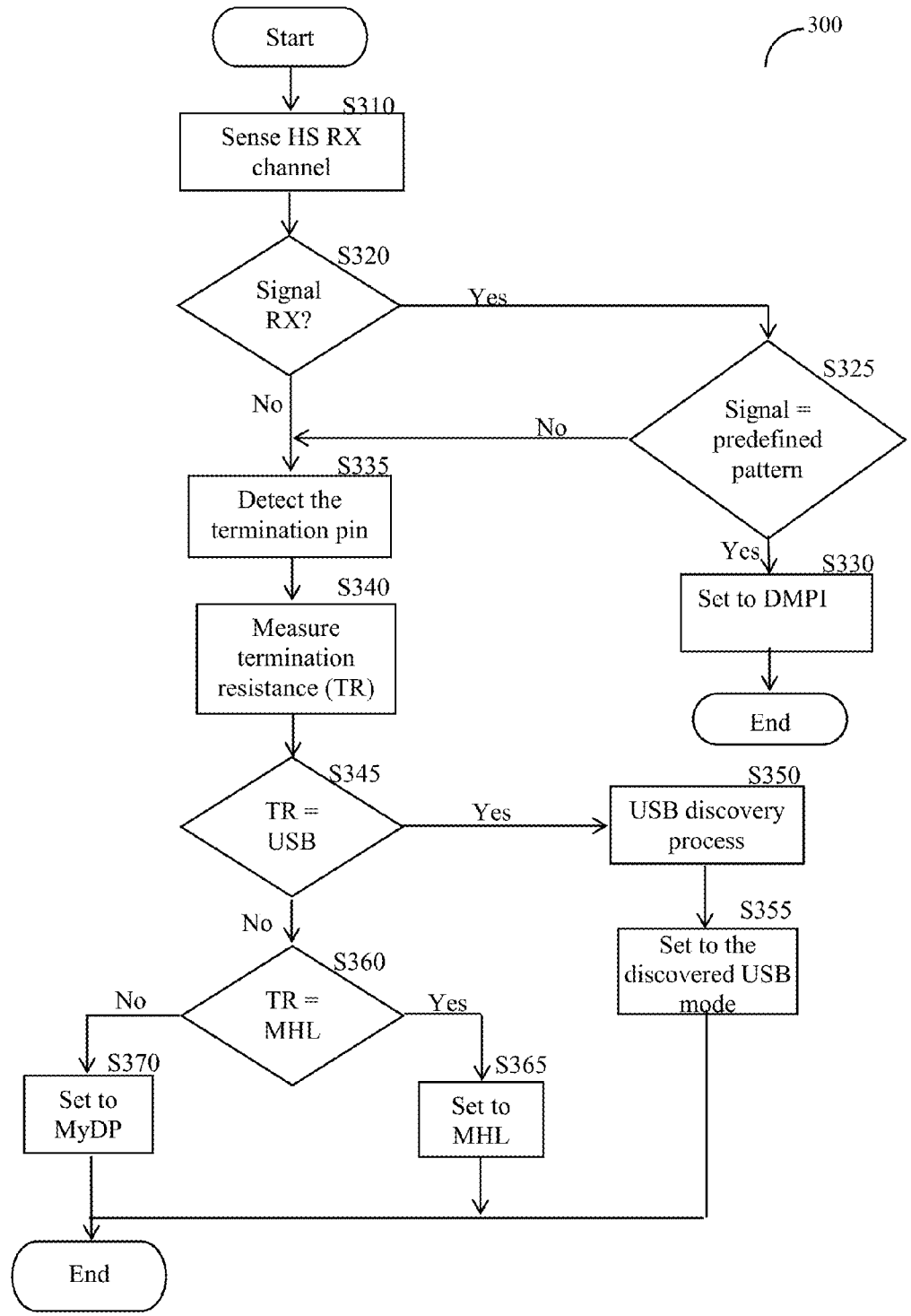
FIG. 3 is a flowchart illustrating a sink interface type recognition process in accordance with one embodiment.

FIG. 3 shows an exemplary and non-limiting flowchart 300 describing the recognition method according one embodiment. The method is performed during the initialization of the devices and or the circuits 120 and 155. At S310, the HSRX channel in the DMPI connector 110 is sensed to detect a signal sent from the sink device 150 over the HSRX channel.

At S320, it is determined if such a signal is received on the HSRX channel. If so, at S325 it is checked if the received signal matches a predefined pattern; otherwise, execution proceeds to S335. If the received signal matches a predefined pattern, then, at S330, it is determined that the connectivity interface of the sink device is DMPI.

At S335, one of the pins, e.g., pin 4 of the DMPI connector 110 is sensed to detect if a termination resistor is connected at the other end of the cable in the corresponding pin. If a termination resistor is detected, then at S340 the resistance value of the termination is measured.

At S345, a check is made to determine if the measured resistance value is the termination value defined for a USB interface. If so, at S350 a USB discovery process is performed to determine the type the USB type interface. Specifically, S350 includes sensing the signal at one of the HSRX channels at the DMPI connector 110. This allows recognizing the speed mode and the port type of the USB interface connected at the other end of the cable. The speed mode may be one of: Low Speed, Full Speed, and High Speed. The mode of the USB interface is recognized as defined by the USB 2.0 specification. If the speed mode is detected as High Speed, it is further checked to determine if the low frequency periodic signals (LFPS) are transmitted on the HSRX channel from the sink device. If such signals are transmitted, it is determined that the sink device 150 operates in a USB 3.0 mode.

As discussed with references to FIGS. 2A and 2B, the DMPI connector 110 in its 10-pin configuration can also support connectivity interfaces of USB 2.0 and MHL, or USB 2.0 and DisplayPort. In such a configuration, the 5 higher pins (1-5) are used for the USB 2.0 signaling and the lower pins (6-10) are used for the MHL or DP signaling. Therefore, in a 10-pin configuration, if it is determined that the USB type is USB 2.0, another check is made, by sensing, one of the lower pins of the DMPI connector to determine if either a MHL or a DP connectivity interface is connected at the other end of the cable. For example, pin 8 is sensed to check if a control signal received on this pin is related to the MHL or DP.

At S355, as a result of the USB discovery process, the DMPI circuit 120 sets the handheld device 100 to operate according to the detected USB mode. If the dual-mode is detected, i.e., USB 2.0 and MHL or USB 2.0 and DP, then the DMPI interface circuit 120 is configured accordingly.

If S345 results in a No answer, then at S360 a check is made to determine if the measured resistance value is the same as the termination value defined for a MHL connectivity interface. If so, at S365, the DMPI circuit 120 sets the handheld device 100 to operate in a MHL mode, i.e., to transmit high definition multimedia signals as defined by the MHL connectivity interface. Otherwise, at S370 the DMPI circuit 120 sets the handheld device 100 to operate in a MyDP mode, i.e., to transmit high definition multimedia signals as defined by the MyDP connectivity interface.

Upon recognition of the type of the interface connectivity of a sink (host) device (e.g., device 150), the DMPI connectivity circuit 120 is set to be compliant with the interface type of the recognized connectivity. This includes, for example, setting analog circuits of an analog front-end of the DMPI circuit 120 to a mode of operation compliant with the source device.

Figure 4:
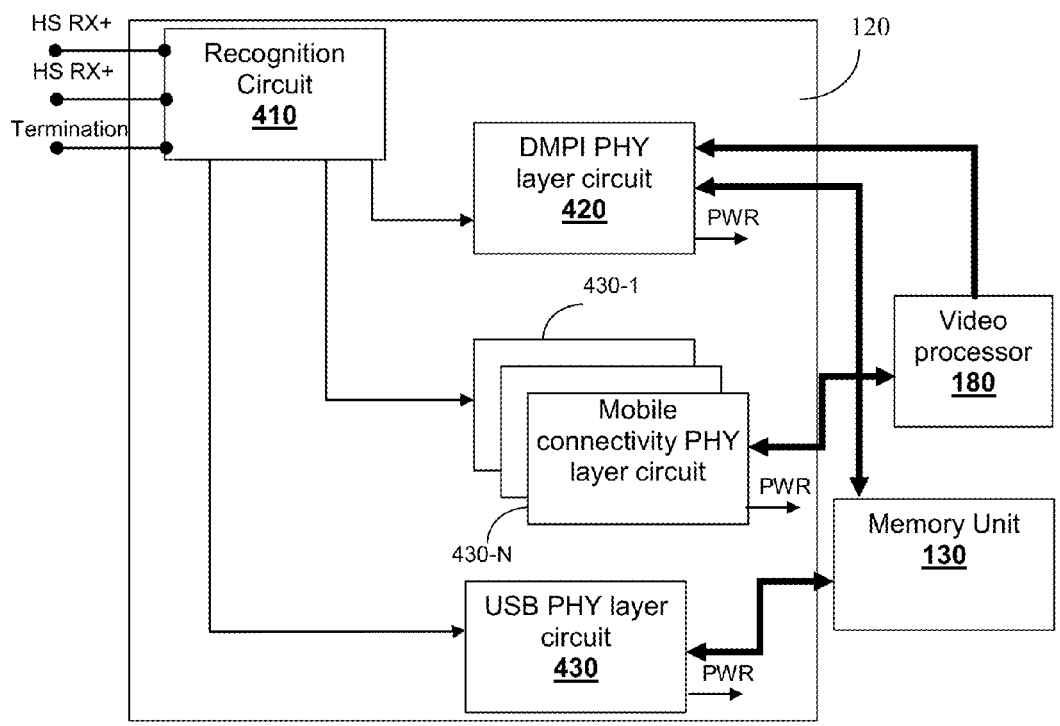
FIG. 4 is a block diagram of a DMPI connectivity circuit integrated in a handheld device and constructed according to one embodiment.

FIG. 4 shows an exemplary block diagram illustrating the DMPI circuit 120 integrated in a handheld device and constructed according to one embodiment. The DMPI circuit 120 includes a recognition circuit 410, a DMPI physical (PHY) layer circuit 420, a plurality of physical (PHY) layer circuits 430-1 through 430-N of a plurality of mobile connectivity interfaces, and a USB physical layer 440. The DMPI PHY layer circuit 420 is connected to a video processor 180 to receive video streams to be transmitted to a sink device.

The DMPI PHY layer circuit 420 is also connected to the memory unit 130 to retrieve user data to be transmitted to a sink device. As noted above, the memory unit 130 may be, for example, a memory flash card, such as SDcard, eMMC, and UFS. The DMPI PHY layer circuit 420 multiplexes the video streams with the user data and control signals. The multiplexed signals are transmitted at a fixed bandwidth on the HSTX channel or channels of the DMPI. The bandwidth on the HSTX channel(s) is determined based on the video resolution and the type of the memory card. The DMPI PHY layer circuit 420 also outputs a power signal (PWR) received on the $V_{BUS}$ channel; such a power signal allows for the charging of the battery of the handheld device. In one embodiment, the DMPI PHY layer circuit 420 can be configured to process signals compliant with the DP connectivity interface.

The PHY layer circuits 430-1 through 430-N are of mobile connectivity interfaces, such as MHL, MyDP, and the like. Each PHY layer circuit 430 is connected only to the video processor 180 to receive the video streams, as such PHY layer circuits 430 cannot transfer user data simultaneously with the video streams to the sink device. A PHY layer circuit of a mobile connectivity interface also outputs a power signal (PWR) received from a sink device; such a power signal allowing for the charging the battery of the handheld device.

The USB PHY layer circuit 440 can support both USB 2.0 and USB 3.0 modes. The USB PHY layer circuit 440 transmits user data (from the memory unit 130) to a sink device or receives user data from the sink device to be stored in the memory unit 130.

The automatic recognition circuit 410 detects the type of the connectivity interface at the sink device and sets the DMPI circuit 120 to operate accordingly. For example, if the connectivity type of the sink device is MHL then a PHY layer circuit 430 that supports the MHL is set and enabled; if the connectivity type of the sink device is DMPI, the DMPI PHY layer circuit 420 is set and enabled; and so on.

The automatic recognition circuit 410 implements the automatic recognition process discussed in detail above. In one embodiment, the circuit 410 includes a detector and a logic unit (both are not shown). The detector implements the sensing of the use of HSRX pins of a DMPI connector, and a termination pin at the other end of the cable identifies a pattern and a resistance value of the termination. The logic unit generates a decision regarding the type of the connectivity interface of the sink device based on the detected pattern and/or the resistance value of the termination. The decision making process is described in detail above with respect to FIG. 3.

Certain embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

While the present invention has been described at some length and with some particularity with respect to the several described embodiments, it is not intended that it should be limited to any such particulars or embodiments or any particular embodiment. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. An apparatus for enabling simultaneous multimedia content and user data streaming from a handheld device to a display device, the apparatus further enables power charging of the handheld device while simultaneously streaming the multimedia content and the user data from the handheld device, comprising:
   a data-multimedia-power interface (DMPI) connector installed in the handheld device and designed to enable the transport of at least high definition multimedia signals, data signals, a power signal, and control signals between the handheld device and the display device; and a DMPI circuit for multiplexing the high definition multimedia signals with the data signals, to enable simultaneous streaming of the respective multimedia content and the user data to the display device, wherein the DMPI circuit further extracts a power signal from the display device for simultaneous power charging of the display device.

2. The apparatus of claim 1, wherein the display device is connected to the handheld device by means of a cable having, at one end, a first connector compliant with the DMPI connector, and at the other end, a second connector compliant with any one of a DMPI, a mobile connectivity interface, and a data interface.

3. The apparatus of claim 2, wherein the mobile connectivity interface is a standardized mobile connectivity interface including any one of: a mobile high-definition link (MHL) standard and a Mobility DisplayPort (MyDP) standard.

4. The apparatus of claim 2, wherein the data interface is any one of: a USB 2.0 interface and a USB 3.0 interface.

5. The apparatus of claim 1, wherein the display device is connected to the handheld device by means of a cable having, at one end, a first connector compliant with the DMPI connector, and at the other end, a second connector compliant with a standardized connectivity interface and a third connector compliant with a data interface of the display device.

6. The apparatus of claim 5, wherein the standardized connectivity interface is any one of: a mobile high-definition link (MHL) standard and a DisplayPort (DP) standard, and wherein the data interface is any one of a USB 2.0 interface and a USB 3.0 interface.

7. The apparatus of claim 1, wherein the DMPI connector includes at least: a $V_{BUS}$ channel for receiving a power signal from the display device, a high-speed receive (HSRX) channel for receiving at least control signals and data signals from the display device, at least one high-speed transmit (HSTX) channel for transmitting the multiplexed high definition multimedia signals and the data signals to the display device, and a ground.

8. The apparatus of claim 7, wherein the DMPI connector is a 5-pin connector that includes one HSTX channel, wherein each of the $V_{BUS}$, the HSRX channel and the ground requires a single pin; and the one HSTX channel requires two pins, wherein the one HSTX channel is a differential pair channel.

9. The apparatus of claim 7, wherein the DMPI connector is a 6-pin connector that includes one HSTX channel, wherein each of the $V_{BUS}$ and the ground requires a single pin; and each of the HSRX channel and the one HSTX channel requires two pins, wherein each of the HSRX channel and the one HSTX channel is a differential pair channel.

10. The apparatus of claim 7, wherein the DMPI connector is a 10-pin connector that includes two HSTX channels, wherein the Vats requires a single pin, and each of the ground, the HSRX channel and the two HSTX channels requires two pins, wherein each of the HSRX channel and the two HSTX channels is a differential pair channel.

11. The apparatus of claim 8, wherein mechanical characteristics of the DMPI connector are the same as a standard AB USB 2.0 micro connector.

12. The apparatus of claim 10, wherein mechanical characteristics of the DMPI connector are the same as a standard AB USB 3.0 micro connector.

13. The apparatus of claim 7, wherein the multiplexed high definition multimedia signals and the data signals are transmitted at a fixed data rate to the display device, wherein the fixed data rate is a function of a video resolution of the high definition multimedia and a bandwidth of a memory unit storing the user data.

14. The apparatus of claim 2, wherein the DMPI circuit includes:
 a recognition circuit for detecting the type of a connectivity interface at the display device connected to the DMPI connector at the handheld;
 a DMPI physical layer circuit connected to a video processor and a memory unit, wherein the DMPI physical layer circuit is configured at least to multiplex the high definition multimedia signals with the data signals; a plurality of physical layer circuits of a plurality of mobile connectivity interfaces for processing multimedia signals according to their respective mobile connectivity interface standards, wherein each of the plurality of physical layer circuits is connected to the video processor; and
 a data interface physical layer is connected to the memory unit and is configured to process data signals according to a data interface standard.

15. The apparatus of claim 14, wherein each of the mobile connectivity interface standards is any one of: a mobile high-definition link (MHL) standard and a Mobility DisplayPort (MyDP) standard, and wherein the data interface standard is any one of a USB 2.0 interface and a USB 3.0 interface standard.

16. The apparatus of claim 15, wherein the recognition circuit is configured to detect the type of the connectivity interface at the display device connected to the DMPI connector based on at least one of a pattern of a signal sent from the display device and a value of a termination pin.

17. The apparatus of claim 16, wherein the type of the connectivity interface is any one of: a MHL interface, a MyDP interface, a DMPI, a USB 2.0 interface, a USB 3.0 interface, a USB 2.0 and MHL interface, and a USB 2.0 and DisplayPort interface.

18. The apparatus of claim 14, wherein the DMPI physical layer circuit is further configured to extract the power signal for charging of the handheld device.

19. A data-multimedia-power interface (DMPI) circuit integrated in a handheld device for enabling at least simultaneous multimedia content and user data streaming from the handheld device to a display device, comprising:
 a recognition circuit for detecting a type of a connectivity interface at the display device connected to the handheld device;
 a DMPI physical layer circuit connected to a video processor and a memory unit, wherein the DMPI physical layer circuit is configured to at least multiplex the high definition multimedia signals with the data signals, and to extract a power signal for simultaneous power charging of the handheld device while streaming the multimedia content and the user data from the handheld device;
 a plurality of physical layer circuits of a plurality of mobile connectivity interfaces for processing multimedia signals according to their respective mobile connectivity interface standards, wherein each of the plurality of physical layer circuits is connected to the video processor; and
 a data interface physical layer is connected to the memory unit and is configured to process data signals according to a data interface standard.

20. The DMPI circuit of claim 19, wherein the DMPI circuit further enables interoperability with the plurality of mobile connectivity interfaces.

21. The DMPI circuit of claim 20, wherein each of the mobile connectivity interface standards is any one of: a mobile high-definition link (MHL) standard and a Mobility DisplayPort (MyDP) standard, and wherein the data interface standard is any one of a USB 2.0 interface and a USB 3.0 interface standard.

22. The DMPI circuit of claim 21, wherein the recognition circuit is configured to detect the type of the connectivity interface at the display device connected to the DMPI connector based on at least one of: a pattern of a signal sent from the display device and a value of a termination pin.

23. The DMPI circuit of claim 22, wherein the type of the connectivity interface at the display device is any one of: a MHL interface, a MyDP interface, a DMPI, a USB 2.0 interface, a USB 3.0 interface, a USB 2.0 and MHL interface, and a USB 2.0 and DisplayPort interface.

24. The DMPI circuit of claim 19, wherein the multiplexed high definition multimedia signals and the data signals are transmitted at a fixed data rate to the display device, wherein the fixed data rate is a function of a video resolution of the high definition multimedia and a bandwidth of the memory unit storing the user data.

25. A data-multimedia-power interface (DMPI) connector for connecting a handheld device to a display device, comprising:
a housing and a plurality of contact pins arranged in the housing, wherein the plurality of contact pins are arranged to provide at least:
a $V_{BUS}$ channel for receiving a power signal from the display device, wherein the power signal allows for charging of a battery of the handheld device, a high-speed receive (HSRX) channel for receiving at least control signals and data signals from the display device, at least one high-speed transmit (HSTX) channel for transmitting multiplexed high definition multimedia signals and the data signals to the display device, and a ground connection.

26. The DMPI connector of claim 25, wherein the DMPI connector is a 5-pin connector that includes one HSTX channel, wherein each of the $V_{BUS}$, the HSRX channel and the ground requires a single pin; and the one HSTX channel requires two pins, wherein the HSTX channel is a differential pair channel.

27. The DMPI connector of claim 25, wherein the DMPI connector is a 6-pin connector that includes one HSTX channel, wherein each of the $V_{BUS}$; and the ground requires a single pin and each of the HSRX channel and the one HSTX channel requires two pins, wherein each of the at HSRX channel and the one HSTX channel is a differential pair channel.

28. The DMPI connector of claim 25, wherein the DMPI connector is a 10-pin connector that includes two HSTX channels, wherein the $V_{BUS}$ requires a single pin, and each of the ground, the HSRX channel and the two HSTX channels requires two pins, wherein each of the HSRX channel and the two HSTX channels is a differential pair channel.

* * * * *